United States Patent
Mahieu

[11] 3,868,128
[45] Feb. 25, 1975

[54] DRAW BAR FOR TOWING AIRCRAFT

[75] Inventor: Yves Mahieu, Arleux, France

[73] Assignee: Societe Anonyme dite: Ateliers Mecaniques du Douaisis, Douai, France

[22] Filed: Sept. 12, 1973

[21] Appl. No.: 396,433

[30] Foreign Application Priority Data
Sept. 15, 1972 France.................. 72.33382

[52] U.S. Cl................ 280/453, 180/14 C, 280/451
[51] Int. Cl................................... B60d 3/00
[58] Field of Search........... 280/453, 476; 180/14 C

[56] References Cited
UNITED STATES PATENTS

| | | | |
|---|---|---|---|
| 2,340,273 | 1/1944 | Phillips | 280/476 R |
| 2,468,669 | 4/1949 | Holmes | 180/14 C X |
| 2,773,703 | 12/1956 | Ferguson et al. | 280/476 R |
| 3,300,233 | 1/1967 | Olson | 280/453 |
| 3,709,522 | 1/1973 | Olson | 280/453 |

*Primary Examiner*—Leo Friaglia
*Attorney, Agent, or Firm*—Robert E. Burns; Emmanuel J. Lobato; Bruce L. Adams

[57] ABSTRACT

A draw bar, particularly for the towing of aircraft. It comprises a tube mounted on a wheeled support frame by means of devices enabling it to oscillate about two axes, i.e., a longitudinal and a transversal axis respectively. The tube has a head at the front end for hooking attachment to the landing gear of an aircraft and a head at the rear end for attachment to a tractor. The head at the front end can be easily interchanged with other types of head to suit the type of aircraft to be towed.

6 Claims, 3 Drawing Figures

PATENTED FEB 25 1975　　　　　　　3,868,128

DRAW BAR FOR TOWING AIRCRAFT

BACKGROUND OF THE INVENTION

This invention relates to draw bar, particularly but not exclusively for the towing of aircraft.

The movement of aircraft along the ground at airports necessitates the use of a tractor connected to the aircraft by means of a towing bar.

The towing bars hitherto used are not entirely satisfactory, being comparatively complex in construction and difficult to place in position, in addition to which they are not suitable for universal use with various different types of aircraft.

The object of the present invention is to remedy these drawbacks.

SUMMARY OF THE INVENTION

According to the invention there is provided a draw bar for towing aircraft, comprising a tube, a first head on one end of the tube for attachment to an aircraft, a second head on the other end of the tube for attachment to a tractor, and means mounting the tube on a support frame for pendular tilting movement with respect thereto, in a manner allowing the tube to oscillate about longitudinal and transverse axes.

In a preferred construction, the first head is immovably fixed to the tube yet easily interchangeable with other types of first head to suit the type of aircraft to be towed, the first head comprising hooking devices for attachment to the aircraft and supported by a base bar which is of constant thickness whatever the type of first head used, the base bar being fixed to the tube by means including shear pins.

The draw bar to which the invention relates offers the advantage that its first head can be affixed very easily to the landing gear of an aircraft and its second head to the tractor, as the tube is mounted so that it can oscillate on its frame about two different axes.

Furthermore, one and the same draw bar can be used for different types of aircraft, as it is sufficient to affix to its front end the appropriate head, corresponding to the type of aircraft to be towed, from among the various heads available. The connection of the head and of the tube by means of shear pins of which the diameter and the spacing vary according to the type of aircraft, ensures full operational safety, since any excessive tractive stress will cause these pins to shear.

BRIEF DESCRIPTION OF THE DRAWING

An embodiment of the present invention will now be described, by way of example, with reference to the accompanying drawing, in which.

DESCRIPTION OF PREFERRED EMBODIMENT

Figure 3:
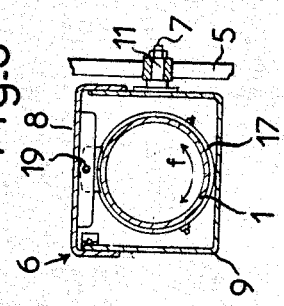
FIG. 3 is a cross section view along the section line III-III of FIG. 1.

A draw bar according to the invention, shown in the drawing, consists essentially of a tube 1 to the front and rear ends of which are affixed respectively a hooking head 2 to be coupled to the landing gear of an aircraft to be towed and a towing eye 3 to be connected to a tractor.

In the transport position the tube 1 rests on the ground by two wheels 4 rotatably mounted at the lower ends of two arms 5. These two arms 5 are articulated to a support frame 6 in such a way that they can pivot about a horizontal and transverse shaft 7 which crosses the axis of the tube 1.

The frame 6 comprises a horizontal upper member 8, of U-shaped cross section, of which the flanges extend downwards and to the central part of which is affixed a support 9 for the train of wheels 4, this support consisting of a channel of U-shaped cross section with its flanges directed upwards and thus surrounding the tube 1. Journals 11, on which the two arms 5 pivot, are affixed to the lateral, vertical flanges of the support 9.

The two arms 5, which are triangular, are interconnected at their upper ends by a horizontal crosspiece 12 coupled to the end of the rod of a hydraulic ram 13, of the single-acting type, of which the body is articulated to the upper member 8 of the frame 6, so as to pivot about a horizontal, transverse shaft 14. The base of the ram is fed with oil through a conduit 15 connected to a hand pump 16 supported by the frame 6. Two restoring springs 32 are connected on the one hand to the crosspiece 12 and on the other to certain fixed points on the frame 6.

The tube 1 is suspended from the support frame 6 by means of two rings 17 and 18 situated one to each side of the horizontal support 9, these rings being articulated, on the pendulum principle, by their upper parts to a longitudinal rod 19 borne by the upper member 8 of the frame 6.

The tube 1 can thus perform a pendular movement, illustrated by the arrow $f$ in FIG. 3, to facilitate the operation of connection for towing. This operation is likewise rendered easier by the fact that the tube can thus pivot about the transverse horizontal shaft 7. To make the handling of the apparatus still easier, the towing head 3 can be mounted so as to rotate about the axis of the tube 1.

Figure 1:
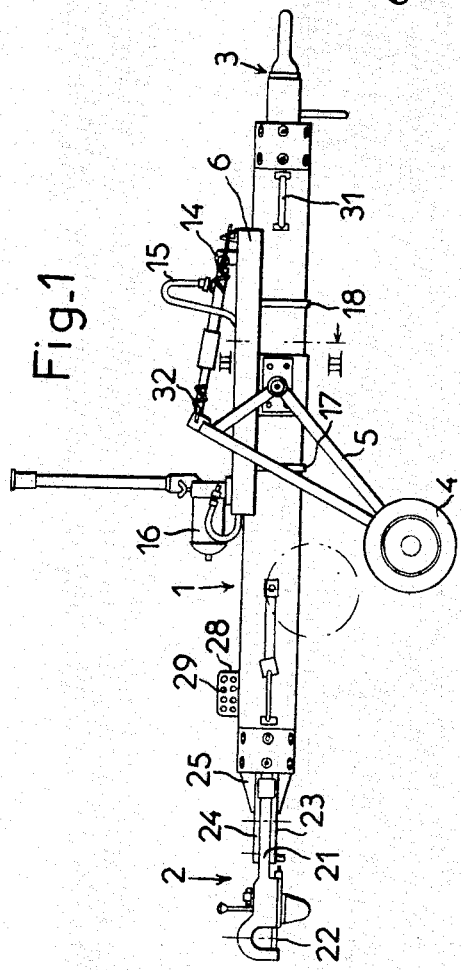
FIG. 1 is a side elevation view of a draw bar according to the invention in a position for transport.
Figure 2:
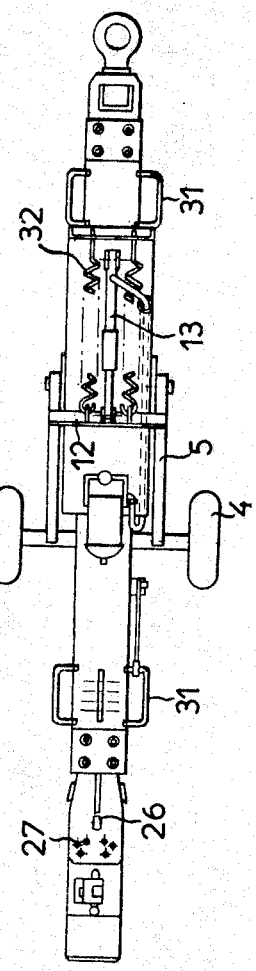
FIG. 2 is a plan view of the draw bar.

While the draw hook is moving in the direction of the aircraft to be towed, the ram 13 is subjected to oil under pressure, so that the arms 5 are moved into the lowered position shown in FIG. 1. Once the draw bar has been connected up to the aircraft, it is sufficient to cut off the feed of oil to the ram 13 to cause the wheels 4 to move up out of the way, and these then re-ascend into a position in the vicinity of the tube 1, shown in broken lines in FIG. 1, under the effect of the restoring springs 32.

The hooking head 2, mounted in the front of the tube 1, is fixed immovably. The head 2 comprises a base 21, consisting of a bar of constant thickness whatever the type of hooking head used; and hooking devices 22 mounted on the base 21 and depending on the type of aircraft to be towed. There are thus as many types of hooking head as there are types of aircraft to be towed.

The base 21 is engaged between two horizontal sides 23 and 24 of a connecting clamp 25 affixed to the tube 1. The base 21 and the sides 23 and 24 of the clamp have aligned holes through which passes a vertical pivot 26. Furthermore, the bar 21 and the sides 23 and 24 of the clamp are provided with correspondingly aligned holes accommodating vertical shear pins 27 of which the diameter and spacing depend on the type of aircraft towed. These pins, provided for safety purposes, will break if the tractive stress becomes excessive and release the hooking head from the clamp 25 and tube.

The tube 1 is likewise provided, in the vicinity of the hooking head 2, with a support 28 for spare shear pins 29. The tube is also fitted with side handles 31, in front and at the rear, to enable it to be moved about.

I claim:

1. A draw bar for towing aircraft, comprising a tube, a first head on one end of the tube for attachment to an aircraft, a second head on the other end of the tube for attachment to a tractor, a wheel-support frame, means mounting the tube on said wheel-support frame for movement about its longitudinal axis, and means mounting said frame and tube for pivoting about a transverse axis.

2. A draw bar in accordance with claim 1, wherein the tube is suspended from the support frame by means of two rings surrounding the tube and articulated at the top to a longitudinal bar mounted on the support frame, the bar constituting a shaft about which the tube can swing.

3. A draw bar in accordance with claim 2, wherein the support frame comprises an upper channel member situated above the tube with its flanges directed downwardly and containing the longitudinal bar forming the suspension shaft for the tube, and a lower channel member integral with the upper member and provided on its lateral, vertically directed flanges with journals on which arms pivot about a common horizontal transverse shaft, the arms supporting wheels at their lower ends.

4. A draw bar in accordance with claim 3, wherein the upper channel member of the frame bears a ram of which the piston rod is coupled to the arms, the ram being connected to a source of fluid under pressure also borne by the upper channel member.

5. A draw bar in accordance with claim 1, including means mounting said first head immovably fixed to the tube and easily interchangeable with other types of first head to suit the type of aircraft to be towed, the first head comprising hooking devices for attachment to the aircraft and supported by a base bar which is of constant thickness whatever the type of first head used, the base bar being fixed to the tube by means including shear pins.

6. A draw bar in accordance with claim 5, wherein the base bar is connected to the tube by a clamp, the base bar engaging between two horizontally disposed sides of the clamp, the base bar and the said sides of the clamp being provided on the one hand with central holes to give passage to a pivot and on the other hand with small lateral holes to give passage to the shear pins.

* * * * *